Dec. 12, 1933. L. A. BAKER ET AL 1,938,992
PROJECTION OF CINEMATOGRAPHIC FILMS
Filed March 13, 1931
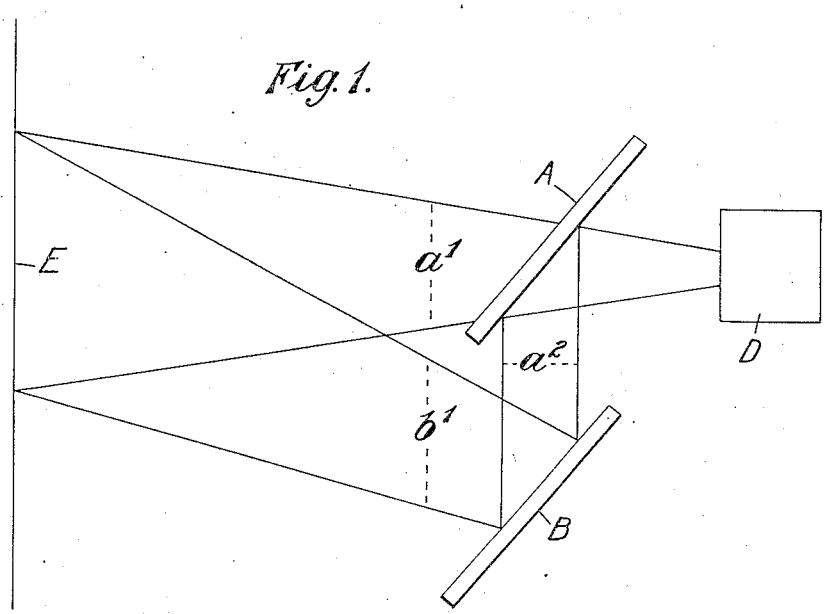
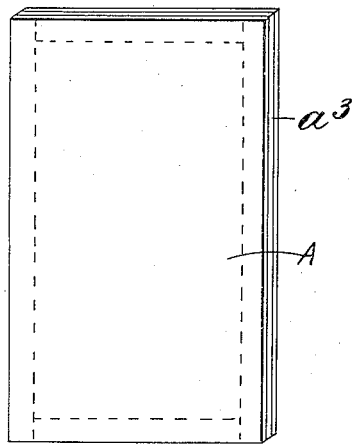
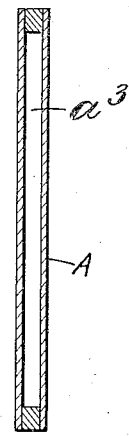
INVENTORS
LEONARD A. BAKER AND
HERBERT WELD Patented Dec. 12, 1933

1,938,992

UNITED STATES PATENT OFFICE 1,938,992

PROJECTION OF CINEMATOGRAPHIC FILMS

Leonard Arthur Baker and Herbert Weld, London, England

Application March 13, 1931, Serial No. 522,315, and in Great Britain November 25, 1930

8 Claims. (Cl. 88—24)

This invention relates to cinematographic projection apparatus of the kind in which a translucent or transparent reflector and a mirror are used in front of the projector, the translucent or transparent reflector allowing a portion of the light to pass through it to produce one image upon a screen whilst some of the light is reflected on to the mirror or other deflecting means to produce a second similar image on such screen superimposed on the first image. The object of the invention is to devise means whereby an enhanced depth and perspective is given to the image, and the grain of the film split up, thereby reducing distortion and effecting the elimination of all eye strain.

According to this invention what we term the primary, or translucent or transparent reflector, which is positioned in front of the projector lens at an angle of approximately 45 degrees, consists of an optical or translucent or transparent glass coloured blue or green, or blue and yellow, or green and yellow, and what we term the secondary or deflecting means, which is also positioned at an angle of approximately 45 degrees on one side of the projector, consists of a gold mirror.

In order that the invention may be clearly understood we have appended the accompanying drawing.

Fig. 1 is a diagrammatical view showing the position in which the primary, or translucent or transparent reflector, and the secondary or deflecting mirror are arranged in front of the projector.

Fig. 2 is a perspective view showing a hollow translucent or transparent reflector made of clear glass, the colouring effect being obtained by the introduction of a coloured liquid.

Fig. 3 is a longitudinal sectional view of the hollow primary.

A represents the primary or translucent or transparent reflector, B the secondary or deflecting mirror, D the projector, and E the screen.

According to this invention the primary A consists of an optical or translucent or transparent glass coloured blue or green, or blue and yellow, or green and yellow, and the secondary B consists of a gold mirror, that is a mirror the coating of which gives a gold reflection.

As shown diagrammatically by Fig. 1 the primary A is positioned in front of the projector lens D at an angle of approximately 45 degrees, and the secondary B is also positioned at an angle of approximately 45 degrees on one side of the projector D. The primary A and the secondary B are supported in any suitable manner that will permit of their being adjusted to suit the particular position in relation to the screen E, so that when the primary A is adjusted to the requisite position in front of the projector D, the beam represented at $a^1$ throws a blue image direct on to the screen E, and the secondary B, which picks up said image, by the beam represented at $a^2$, off the surface of the primary, throws, by the beam represented at $b^1$, a gold image on to the screen so as to superimpose such secondary image on the primary image, thus a gold outline is shown on one side and a coloured or blue outline on the other side.

The screen E upon which the image is projected may be coloured yellow, or a combination of colours which, when the image is projected thereon, cause such image to appear either blue, green, or yellow, or a combination of these colours.

At Figs. 2 and 3 we have shown how in place of making the primary A of coloured glass the same effect may be obtained by making it hollow of clear glass, and then filling the cavity $a^3$ with a liquid of the requisite colour.

What we claim as our invention and desire to secure by Letters Patent is:—

1. The combination with a source of light, a blue transparent reflector angularly positioned in front of said light and adapted to project beams upon a screen or the like and upon a second reflector, a second reflector angularly positioned from the first mentioned reflector, said reflector being a gold colored mirror and adapted to reflect the rays obtained from the colored transparent reflector upon the screen whereby superimposing of light beams is obtained upon the screen as a means for eliminating eye strain when reviewing motion pictures or the like.

2. In combination with a source of light, a blue translucent reflector angularly arranged in front of said light, and adapted to project beams upon a screen and a secondary reflector, a secondary reflector angularly positioned opposite said translucent reflector, said reflector being a gold colored mirror and adapted to project rays obobtained from the blue translucent reflector upon a screen and superimpose a reflected gold colored beam on the blue beam whereby a gold and blue color is obtained upon the screen and which eliminates eye strain when reviewing motion pictures or the like.

3. The combination with a source of light, a substantially transparent reflector of an eye-strain-relieving color angularly positioned in front of said light and adapted to project beams upon a screen or the like and upon a second reflector, a second reflector angularly positioned from said first mentioned reflector, said second reflector being a mirror of a golden color and adapted to reflect rays obtained from the transparent reflector upon the screen whereby superimposing of light beams is obtained as a means for effecting the elimination of eye-strain when reviewing motion pictures or the like.

4. The combination of claim 3 characterized by said transparent reflector having a combination of eye-strain-relieving colors.

5. The combination of claim 3 characterized by said transparent reflector being of a green color.

6. The combination of claim 3 characterized by said transparent reflector being of a blue and yellow color.

7. The combination with a source of light, a reflector angularly positioned in front of said light, said reflector comprising a substantially hollow transparent frame for containing coloring having an eye-strain-relieving characteristic, said reflector adapted to project beams upon a screen or the like and upon a second reflector, said second reflector being a mirror of a golden color and angularly positioned from the first mentioned reflector for reflecting rays obtained from the first mentioned reflector upon the screen whereby superimposing of light beams is obtained as a means for eliminating eye strain, when reviewing motion pictures or the like.

8. The structure of claim 7 characterized by said eye-strain-relieving coloring being a liquid.

LEONARD ARTHUR BAKER.
HERBERT WELD.